(12) United States Patent
Lv et al.

(10) Patent No.: US 10,196,771 B2
(45) Date of Patent: Feb. 5, 2019

(54) REDUCTION CLUTCH CAPABLE OF POSITIONING INNER TUB AND WASHING MACHINE

(71) Applicant: QINGDAO HAIER WASHING MACHINE CO., LTD., Qingdao, Shandong (CN)

(72) Inventors: Peishi Lv, Shandong (CN); Lin Yang, Shandong (CN); Gangjin Zhang, Shandong (CN); Yun Tian, Shandong (CN); Chunxia Zhou, Shandong (CN)

(73) Assignee: QINGDAO HAIER WASHING MACHINE CO., LTD., Qingdao, Shandong (CN)

( * ) Notice: Subject to any disclaimer, the term of this patent is extended or adjusted under 35 U.S.C. 154(b) by 0 days.

(21) Appl. No.: 15/546,987

(22) PCT Filed: Nov. 23, 2015

(86) PCT No.: PCT/CN2015/095296
§ 371 (c)(1),
(2) Date: Jul. 27, 2017

(87) PCT Pub. No.: WO2016/119513
PCT Pub. Date: Aug. 4, 2016

(65) Prior Publication Data
US 2018/0002855 A1    Jan. 4, 2018

(30) Foreign Application Priority Data

Jan. 30, 2015 (CN) .......................... 2015 1 0048097

(51) Int. Cl.
*D06F 37/40* (2006.01)
*D06F 37/30* (2006.01)
(Continued)

(52) U.S. Cl.
CPC .............. *D06F 37/40* (2013.01); *D06F 23/04* (2013.01); *D06F 37/12* (2013.01); *D06F 37/30* (2013.01);
(Continued)

(58) Field of Classification Search
CPC .......... D06F 37/12; D06F 37/30; D06F 37/40; D06F 23/04; F16D 11/10; F16D 2011/002
See application file for complete search history.

(56) References Cited

U.S. PATENT DOCUMENTS 5,152,159 A    10/1992  Kabeya et al.
2002/0166349 A1*  11/2002  Lim ....................... D06F 37/40
                                                                    68/23.7
(Continued)

FOREIGN PATENT DOCUMENTS

CN           2755140 Y      2/2006
CN         102560961 A      7/2012
(Continued)

OTHER PUBLICATIONS

International Search Report (PCT/ISA/210) dated Mar. 2, 2016, by the State Intellectual Property Office of the P.R. China as the International Searching Authority for International Application No. PCT/CN2015/095296.
(Continued)

*Primary Examiner* — Joseph L. Perrin
(74) *Attorney, Agent, or Firm* — Buchanan Ingersoll & Rooney PC

(57) ABSTRACT

A reduction clutch for positioning an inner tub has an input shaft connected to an output shaft. An input shaft sleeve is connected to an output shaft sleeve. A clutch shaft sleeve slides axially downward to connect to a driving device and slides upward to connect to a fixed disk at one position in the circumferential direction. The positioning of the input shaft
(Continued)

sleeve, the output shaft sleeve and an inner tub in the circumferential direction is achieved by the connecting position. A first water drainage hole is arranged at the bottom of the inner tub. An included angle between a protrusion on the upper portion of the clutch shaft sleeve and the first water drainage hole of the inner tub is equal to an included angle between a recess on the fixed disk fitting with the protrusion and the water drainage control mechanism on the outer tub.

20 Claims, 6 Drawing Sheets

(51) Int. Cl.
    *D06F 23/04*     (2006.01)
    *D06F 37/12*     (2006.01)
    *D06F 39/08*     (2006.01)
    *F16D 11/10*     (2006.01)
    *F16D 11/00*     (2006.01)

(52) U.S. Cl.
    CPC ............ *D06F 39/08* (2013.01); *D06F 39/083* (2013.01); *F16D 11/10* (2013.01); *F16D 2011/002* (2013.01)

(56) References Cited

U.S. PATENT DOCUMENTS

| | | | | |
|---|---|---|---|---|
| 2012/0137738 A1* | 6/2012 | Lee | ......................... | D06F 21/08 |
| | | | | 68/12.24 |
| 2013/0199247 A1* | 8/2013 | Lee | ......................... | D06F 37/30 |
| | | | | 68/131 |
| 2016/0010265 A1* | 1/2016 | Jang | ......................... | D06F 37/30 |
| | | | | 310/71 |
| 2016/0201747 A1* | 7/2016 | Lv | ......................... | D06F 37/30 |
| | | | | 192/12 D |

FOREIGN PATENT DOCUMENTS

| | | |
|---|---|---|
| CN | 203475166 U | 3/2014 |
| CN | 204474981 U | 7/2015 |
| JP | H 03-284295 A | 12/1991 |
| JP | H 04-002398 A | 1/1992 |

OTHER PUBLICATIONS

Written Opinion (PCT/ISA/237) dated Mar. 2, 2016, by the State Intellectual Property Office of the P.R. China as the International Searching Authority for International Application No. PCT/CN2015/095296.

* cited by examiner

REDUCTION CLUTCH CAPABLE OF POSITIONING INNER TUB AND WASHING MACHINE

FIELD OF THE INVENTION

The present disclosure relates to a field of washing machines, particularly to a reduction clutch capable of positioning an inner tub and a washing machine.

BACKGROUND OF THE INVENTION

In the existing pulsator washing machines, an inner tub and an outer tub communicate with each other through drainage holes, the inner tub is a washing tub and the outer tub is a water containing tub. The part of water filled in the space between the outer wall of the inner tub and the inner wall of the outer tub is not used for washing, only the water inside the inner tub is genuinely used for washing and the water resources are wasted. In addition, too much water between the inner and outer tubs reduces the concentration of detergent in the washing solution. At the same time, as the water flow constantly flows in and out between the inner tub and the outer tub, the space between the inner tub and the outer tub becomes a place for hiding filth after continued use. The scale of the tap water, the free powder of the laundry, the cellulose of the clothes, the organic matter and the dust and bacteria brought into by the clothes are easily left on the walls between the inner and outer tubs. These molds are bred from the accumulated large amount of dirt which is not effectively removed in the long used washing machine. If this dirt which cannot be seen by users stays inside the washing machine, these bacteria will adhere on the washing laundry during the next washing and cause cross-contamination problems to users.

The patent No. 201210011789.1 relates to a sealed inner tub comprising side wall and bottom which are integrally connected, and the side wall and bottom are provided sealed. A drainage recess is provided at the top of the side wall, and the water in the inner tub and the water in the laundry are discharged outside the inner tub through the drainage recess. The patent further relates to a washing machine with the sealed inner tub and a washing method of the washing machine. With the design of no holes on the inner tub, the purpose of saving a lot of washing water can be realized by preventing the washing water from entering the space between the inner and outer tubs. At the same time, the dirt and bacteria between the inner and outer tubs does not come into contact with the clothes in the inner tub through water flow which is effectively preventing cross-contamination of bacteria and makes the washing machine more health, environmental protection and safety. However, all the water is discharged from the top, and the line debris, sediment and other dirt in the water cannot be completely discharged, the remaining dirt will cause contamination to clothes during next washing.

The patent No. 200420107890.8 relates to a full-automatic washing machine which comprises a housing, a washing dewatering tub, a water containing tub and a driving device. The water containing tub is mounted outside the washing dewatering tub and fixed connected to the housing. A sealing means is provided between an inner bottom of the water containing tub and an outer bottom of the washing dewatering tub and a sealed chamber is form inside the sealing means. No through holes are on an outer side wall of the washing dewatering tub and a drainage hole is communicated with the sealed chamber is provided at a bottom of the washing dewatering tub. A first drainage hole communicated with a drainage pipe is provided on the water containing tub and a drainage valve is provided on the drainage pipe. The water containing tub is fixedly connected to the housing by a boom. One end of the boom is connected to an inner wall of an upper portion of the housing, the other end of the boom is connected to an outer wall of the water containing tub. However, the sealing means is easy to leak with long time operation and abrasion and if the water quality is poor with high sediment concentration, the service life of the sealing means will be significantly reduced, so the proper function cannot be played. It is not suitable for use in a state where the washing capacity is large, and the reliability is poor.

As a preferred scheme, a row of drainage holes is not provided at a center part of a bottom of the inner tub but provided at a side part of the bottom of the inner tub, and the control mechanism of the drainage holes is provided at a bottom of the outer tub. However, if the drainage holes are provided at the side part of the bottom, the inner tub needs to be positioned at every end of the dewatering process or at every start of the water supply of washing process as the inner tub rotates. Thus, it ensures the alignment between the drainage holes of the inner tub and the control mechanism of the drainage holes of the outer tub.

In the view of foregoing, the present disclosure is proposed.

SUMMARY OF THE INVENTION

An object of the present disclosure is to overcome the shortcomings of the prior art, and provides a reduction clutch capable of positioning an inner tub and a washing machine. The reduction clutch not only can control the switch of washing process and the dewatering process, but also can lock the inner tub.

In order to achieve that object, the following technical scheme is adopted by the present disclosure. A reduction clutch capable of positioning the inner tub comprises an input shaft, an input shaft sleeve, a gear train, an output shaft for driving a pulsator, an output shaft sleeve for driving the inner tub and a clutch shaft sleeve outside the output shaft sleeve that is slidably and irrotationally connected to the output shaft sleeve. The input shaft is connected to the output shaft via the gear train, the input shaft sleeve is connected to the output shaft sleeve and the clutch shaft sleeve slides axially to a lower portion to connect to a driving device and slides to an upper portion to connect to a fixed disk. The clutch shaft sleeve sliding to the upper portion only has one connecting position capable of connecting to the fixed disk in the circumferential direction and positioning of the input shaft sleeve, the output shaft sleeve and the inner tub in the circumferential direction is achieved by the connecting position.

The clutch shaft sleeve is connected to the fixed disk by spline tooth connection, a connection part of the upper portion of the clutch shaft sleeve fitting with the fixed disk is provided with at least one protrusion and a recess corresponding to the protrusion is provided on the fixed disk. When the clutch shaft sleeve rotates a circle, the protrusion of the clutch shaft sleeve can insert to the recess of the fixed disk for fitting connection at only one position, and the positioning of the input shaft sleeve, the output shaft sleeve and the inner tub in the circumferential is achieved by the connecting position.

The connection part of the upper portion of the clutch shaft sleeve fitting with the fixed disk is provided with only one protrusion, and only one recess corresponding to the protrusion is provided on the fixed disk. A shape and size of the protrusion are the same as a shape and size of the recess, the protrusion and the recess are not able to rotate relatively to each other in the circumferential direction when they fit in so that the inner tub is positioned.

The connection part of the upper portion of the clutch shaft sleeve fitting with the fixed disk is provided with a plurality of protrusions, the shape and/or size of one of the protrusions are different from the shape and/or size of the other protrusions. Recesses corresponding to the protrusions are provided on the fixed disk.

The connection part of the upper portion of the clutch shaft sleeve fitting with the fixed disk is provided with a plurality of protrusions which are nonuniformly distributed on the circumference and recesses corresponding to the protrusions are provided on the fixed disk.

An upper end surface of the clutch shaft sleeve is connected with a lower end surface of the fixed disk.

The upper end surface of the clutch shaft sleeve is provided with the protrusion and the lower end surface of the fixed disk is provided with the recess, or the upper end surface of the clutch shaft sleeve is provided with the recess and the lower end surface of the fixed disk is provided with the protrusion.

An outer circumference of the upper portion of the clutch shaft sleeve is engaged with an inner circumference of a lower portion of the fixed disk.

The outer circumference of the upper portion of the clutch shaft sleeve is provided with the protrusion and the inner circumference of the lower portion of the fixed disk is provided with the recess, or the outer circumference of the upper portion of the clutch shaft sleeve is provided with the recess and the inner circumference of the lower portion of the fixed disk is provided with the protrusion.

An inner circumference of the upper portion of the clutch shaft sleeve is engaged with an outer circumference of the lower portion of the fixed disk.

The inner circumference of the upper portion of the clutch shaft sleeve is provided with the protrusion and the outer circumference of the lower portion of the fixed disk is provided with the recess, or the inner circumference of the upper portion of the clutch shaft sleeve is provided with the recess and the outer circumference of the lower portion of the fixed disk is provided with the protrusion.

A washing machine having the above-described reduction clutch capable of positioning the inner tub, a first drainage hole is provided at the bottom of the inner tub, and a second drainage holes are arranged in a circle on an upper portion of the inner tub. Apart from the first drainage hole and the second drainage holes, there are no leakage holes communicating with the outer tub on the inner tub. That is, the inner tub is the water containing tub during the washing process and there is no water between the inner and outer tubs. A drainage control mechanism for controlling an opening/closing of the first drainage hole is provided at the bottom of the outer tub. An included angle between the protrusion on the upper portion of the clutch shaft sleeve and the first water drainage hole of the inner tub is equal to an included angle between a recess on the fixed disk fitting with the protrusion and the drainage control mechanism on the outer tub.

The following advantageous effects are obtained by adopting the technical solution according to the present disclosure.

1. The disclosure can eliminate the separate positioning structure and simplify the structure of the washing machine. The reduction clutch not only controls the switching of the washing and dewatering process, and can also positions and locks the inner tub, so that the reduction clutch is used for the utmost utilization and the control is reliable.

2. The washing water is only contained in the inner tub during the washing process and there is no washing water between the inner and outer tubs, which has the characteristics of water conservation. During the drainage and/or dewatering process, the first drainage hole is open and most of the water, sediment, particles and other remains are discharged to the outer tub through the first drainage hole at the lower portion of the inner tub. The water in the laundry is discharged to the outer tub through the second drainage holes at the upper portion of the inner tub during the high-speed spinning dewatering of the inner tub and further discharged outside of the washing machine directly through the drainage outlet, drainage pipe at the bottom of the outer tub. Thus, fast drainage is realized and the drainage, sewage effect is good.

Embodiments of the present disclosure will be further described in details with reference to the accompanying drawings.

Wherein: 1. Input shaft, 2. Input shaft sleeve, 3. Gear train, 5. Output shaft sleeve, 6. Clutch shaft sleeve, 7. Driving device, 8. Fixed disk, 9. Protrusion, 10. Recess, 11. Upper shell, 12. Lower shell, 13. Shift fork, 14. Traction motor, 15. Stator, 16. Rotor, 17. Torque shaft sleeve, 100. Inner tub, 200. Outer tub, 400. Drainage control mechanism, 500. Reduction clutch, 105. First drainage hole, 106. Second drainage hole, 301. Locking hole

DETAILED DESCRIPTION OF THE INVENTION

Figure 9:
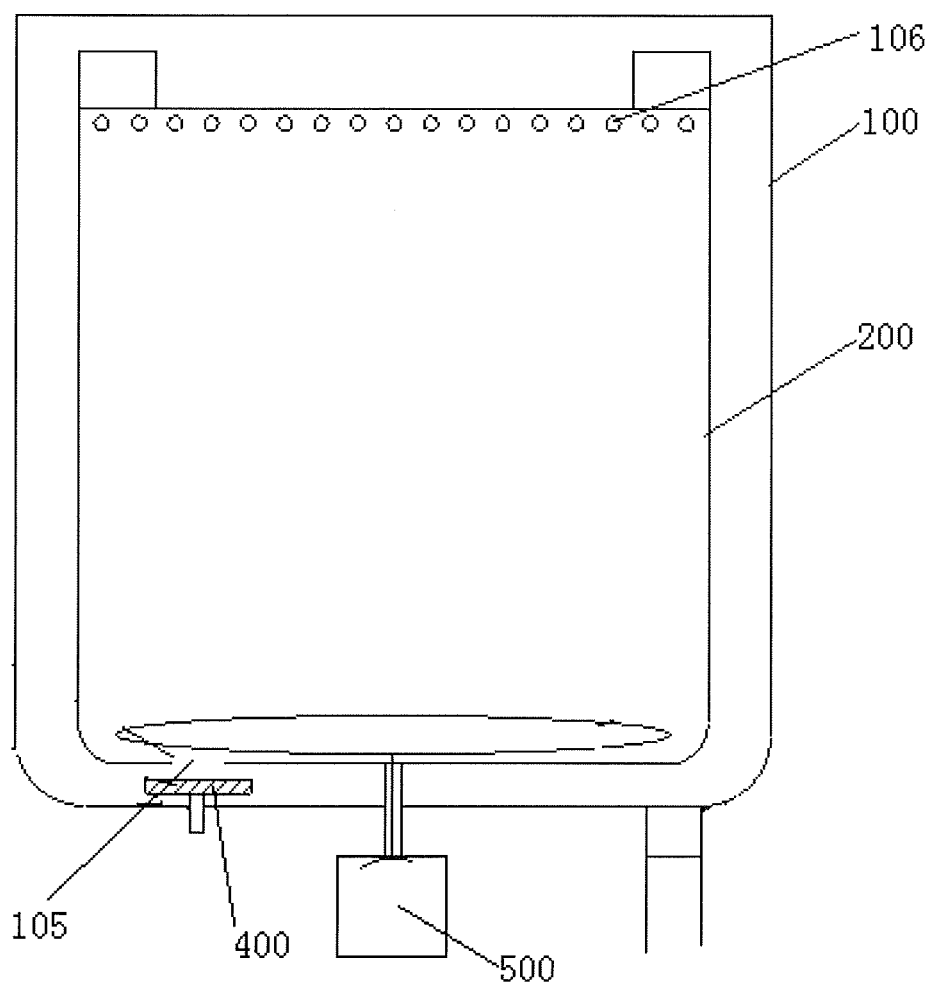
FIG. 9: a structural diagram of a washing machine of the present disclosure.

As shown in FIG. 9, a washing machine disclosed by the present disclosure comprises an inner tub 100, an outer tub 200. One first drainage hole 105 is provided at a bottom of the inner tub, second drainage holes 106 are provided in a circle on an upper portion of the inner tub. And apart from the first drainage hole and the second drainage holes, there are no leakage holes communicating with the outer tub provided on the inner tub. During the washing process, the first drainage hole at the bottom of the inner tub is closed and water is only contained inside the inner tub, there is no water between the inner tub 100 and the outer tub 200. After the completion of the washing process, the first drainage hole 105 at the bottom of the inner tub is open and most of water is discharged away through the first drainage hole 105. During the dewatering process, as the inner tub spins, the water discharged from the laundry is lifted up along the tub wall under the centrifugal force and discharged into the space between the inner tub and the outer tub through the second drainage holes 106 at the upper portion of the inner tub and discharged away through the drainage hole on the outer tub. In that case, the washing water is only contained inside the inner tub and there is no washing water between the inner and outer tubs, which has the characteristics of water conservation. During the drainage and/or dewatering process, the first drainage hole 105 is open and most of the water, sediment, particles and other remains are discharged to the outer tub through the first drainage hole at the lower portion of the inner tub. The water in the laundry is discharged to the outer tub through the second drainage holes 106 at the upper portion of the inner tub during the high-speed spinning dewatering process of the inner tub and further discharged outside of the washing machine directly through the drainage outlet, drainage pipe at the bottom of the outer tub. Thus, fast drainage is realized and the drainage, sewage effect is good.

In the present disclosure, a drainage control mechanism 400 for controlling an opening/closing of the first drainage hole is provided under the first drainage hole 105, which is arranged at the bottom of the outer tub. During the washing process, the drainage control mechanism controls the first drainage hole to close, and during the dewatering process the drainage control mechanism controls the first drainage hole to open. The first drainage hole is arranged on the inner tub and the inner tub spins during the dewatering process, therefore, when the washing machine needs to switch to a washing state and when the first drainage hole 105 needs to be closed by the drainage control mechanism, the first drainage hole and the drainage control mechanism may not at the same position. The switching of the dewatering state and the washing state is realized by sliding the clutch shaft sleeve up and down of the reduction clutch of the washing machine. During the washing process, the clutch shaft sleeve slides upward to position the inner tub, and only the pulsator rotates. During the dewatering process, the clutch shaft sleeve slides downward, the inner tub and the pulsator rotate at the same time. The first drainage hole of the inner tub is moving during the dewatering process but the drainage control mechanism 400 for controlling the first drainage hole 105 is not moving. When switched to the washing state, it is necessary to align the first drainage hole with the drainage control mechanism. In the present disclosure, the structure of the reduction clutch is used cleverly. When the clutch shaft slides upward switching to the washing state, the inner tub is controlled to be positioned to a same place each time which ensures the alignment between the first drainage hole on the inner tub and the drainage control mechanism. The inner tub is locked to prevent from rotating during the washing process, and the failure of the drainage control mechanism, the leakage of the inner tub caused by the misalignment between the first drainage hole and the drainage control mechanism are also avoided.

Figure 1:
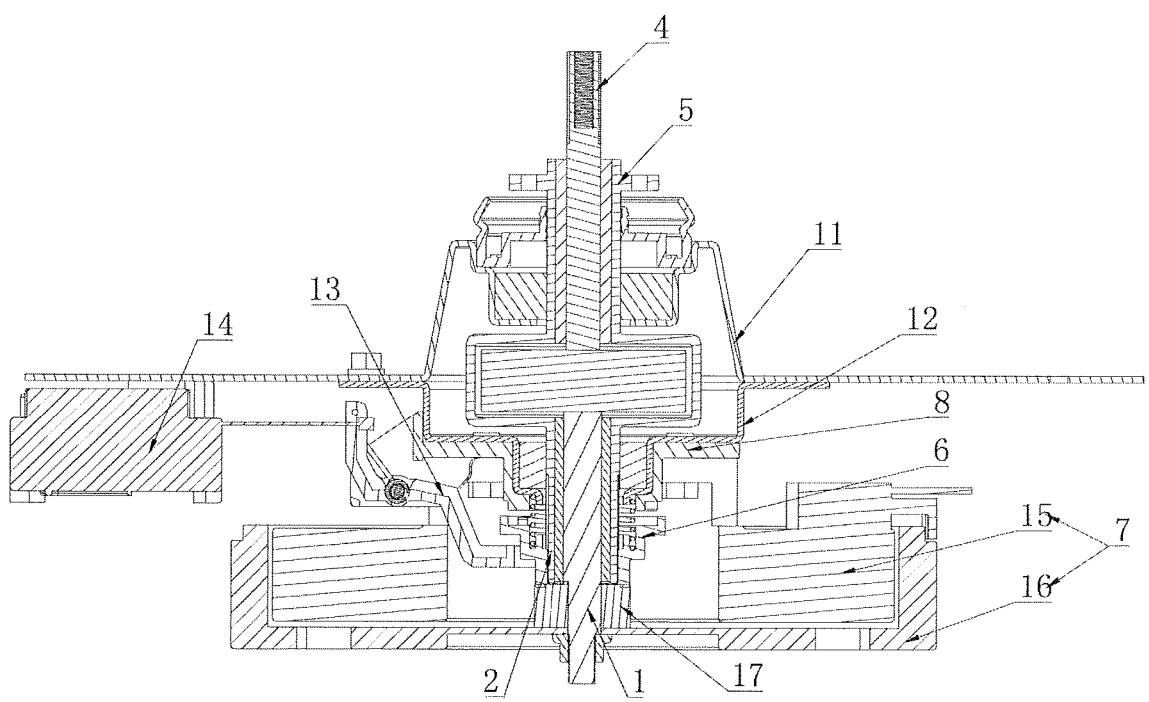
FIG. 1: a cross-sectional view of a structure of a reduction clutch of the present disclosure.
Figure 2:
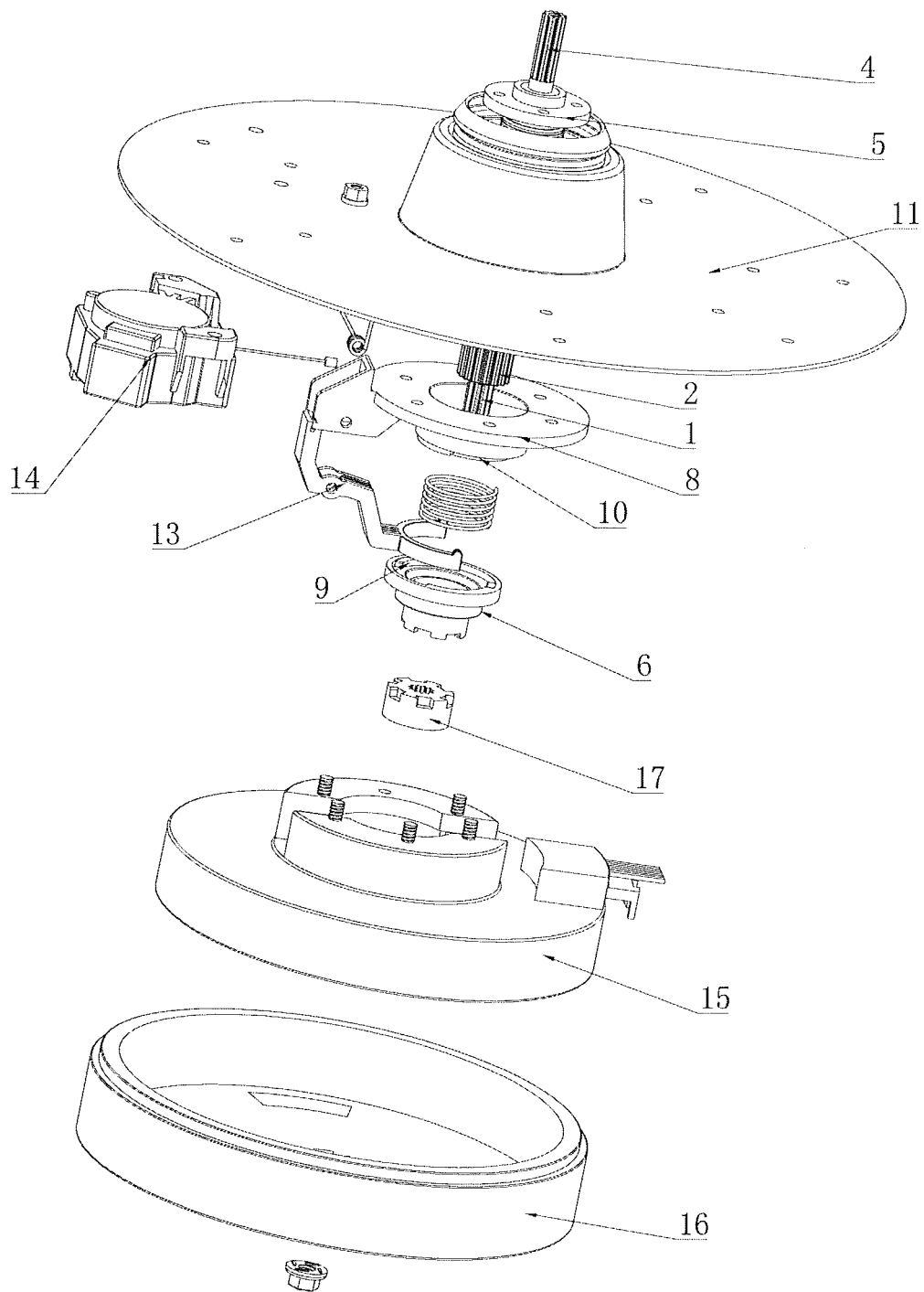
FIG. 2: an explosion diagram of a structure of the reduction clutch of the present disclosure.

As shown in the FIG. 1 and FIG. 2, the reduction clutch capable of positioning the inner tub of the present disclosure comprises: an input shaft 1, an input shaft sleeve 2, a gear train 3, an output shaft 4 for driving the pulsator, an output shaft sleeve 5 for driving the inner tub and a clutch shaft sleeve 6 outside the output shaft sleeve 5 that is slidably in the axis direction and irrotationally in the circumferential direction connected to the output shaft sleeve 5. The input shaft 1 is connected to the output shaft 4 via the gear train 3, the input shaft 2 sleeve is connected to the output shaft sleeve 5. The clutch shaft sleeve 6 slides axially to a lower portion to connect to a driving device 7 and slides to an upper portion to connect to a fixed disk 8. The clutch shaft sleeve 6 sliding to the upper portion only has one connecting position capable of connecting to the fixed disk 8 in the circumferential direction and positioning of the input shaft sleeve 2, the output shaft sleeve 5 and the inner tub 100 in the circumferential direction is achieved by the connecting position. So that only the inner tub rotates until the first drainage hole is corresponding to the drainage control mechanism, the clutch shaft sleeve slides to the upper portion to connect to the fixed disk and to lock the inner tub. Therefore, the inner tub does not rotate around during the washing process, so that the washing effect and the energy efficiency of the washing machine can be effectively improved and the leakage of the first drainage hole is avoided to meet people's best laundry experience.

The clutch shaft sleeve 6 is slidably and irrotationally connected to the input shaft sleeve 2, preferably, a spline joint. Key/groove in the axis direction is provided on/in an inner wall of the clutch shaft sleeve 6 and groove/key in the axis direction is provided in/on an outer circumference of the input shaft sleeve 2, so that the clutch shaft sleeve and the input shaft sleeve are able to slide relatively along the axis direction and not able to rotate relatively to each other in the axis direction. The input shaft sleeve 2 and the output shaft sleeve 5 are connected to be one piece, and the output shaft sleeve 5 is fixed connected to the inner tub, so that the clutch shaft sleeve 6 and the inner tub are relatively fixed in the circumferential direction, and the clutch shaft sleeve 6 and the first drainage hole at the bottom of the inner tub are relatively fixed in the circumferential direction. The fixed disk 8 as a fixed structure is mounted on the housing of the reduction clutch, and the outer tub, as a fixed structure (do not consider vibration), is connected to the housing of the washing machine by a boom. The fixed disk 8 and the outer tub are relatively fixed in the circumferential direction, and the fixed disk and the drainage control mechanism at the bottom of the outer tub are relatively fixed. The clutch sleeve slides to the upper portion in the circumferential direction with only one position to be connected to the fixed disk. When the clutch shaft sleeve 6 is in connection with the fixed disk 8, the first drainage hole and the drainage control mechanism are corresponding to each other. Thereafter, the drainage control mechanism closes the first drainage hole and the inner tub is supplied with water to wash, at this time, the washing water is in the inner tub and there is no water between the inner and outer tubs.

The clutch shaft sleeve 6 is connected to the fixed disk 8 by spline-tooth connection, a connection part of the upper portion of the clutch shaft sleeve 6 fitting with the fixed disk 8 is provided with at least one protrusion 9 and a recess 10 corresponding to the protrusion 9 is provided on the fixed disk 8. When the clutch shaft sleeve 6 rotates a circle, the protrusion 9 of the clutch shaft sleeve 6 can insert to the recess 10 of the fixed disk 8 for fitting connection at only one position, and the positioning of the input shaft sleeve 2, the output shaft sleeve 5 and the inner tub 100 in the circumferential is achieved by the connecting position. An included angle between the protrusion 9 on the upper portion of the clutch shaft sleeve 6 and the first water drainage hole of the inner tub is equal to an included angle between a recess 10 on the fixed disk 8 and the drainage control mechanism on the outer tub. So that ensures the inner tub and the drainage control mechanism on the outer tub are corresponding to each other when the protrusion 9 of the clutch shaft sleeve 6 inserts to the recess 10 on the fixed disk 8 and fitting connected to each other.

Figure 3:
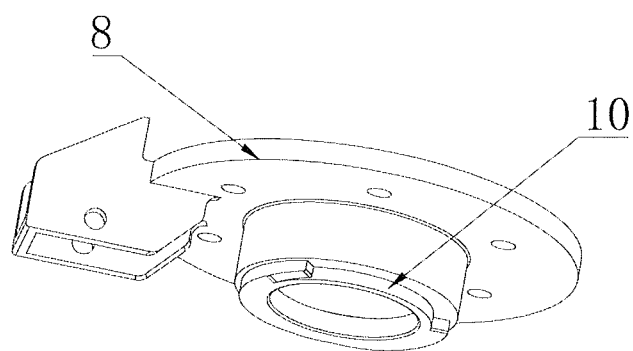
FIG. 3: a structural diagram of a fixed disk of the present disclosure.
Figure 4:
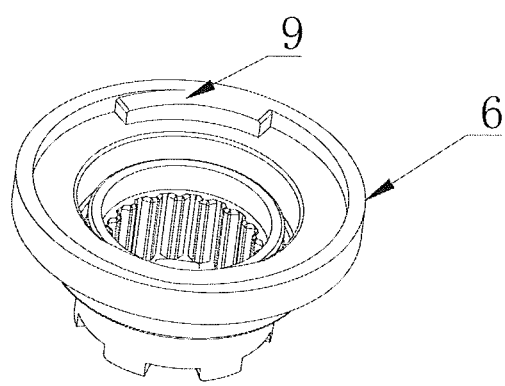
FIG. 4: a structural diagram of a clutch shaft sleeve of the present disclosure.

As shown in FIG. 3 and FIG. 4, the connection part of the upper portion of the clutch shaft sleeve 6 fitting with the fixed disk 8 is provided with only one protrusion 9, and only one recess 10 corresponding to the protrusion 9 is provided on the fixed disk 8. A shape and size of the protrusion 9 are the same as a shape and size of the recess 10, so that ensures the protrusion 9 of the clutch shaft sleeve 6 can insert to the recess of the fixed disk 8 for fitting connection at only one position when the clutch shaft sleeve 6 rotates a circle. The clutch shaft sleeve and the fixed disk are not able to rotate with each other after the connection. The included angle between the protrusion 9 on the upper portion of the clutch shaft sleeve 6 and the first water drainage hole of the inner tub is equal to the included angle between the recess 10 on the fixed disk 8 and the drainage control mechanism on the outer tub. So that ensures the inner tub and the drainage control mechanism on the outer tub are corresponding to each other when the protrusion 9 of the clutch shaft sleeve 6 inserts to the recess 10 on the fixed disk 8 and fitting connected to each other. The disclosure can eliminate the separate positioning structure and simplify the structure of the washing machine. The reduction clutch not only controls the switching of the washing and dewatering process, and can also positions and locks the inner tub, so that the reduction clutch is used for the utmost utilization and the control is reliable.

Figure 5:
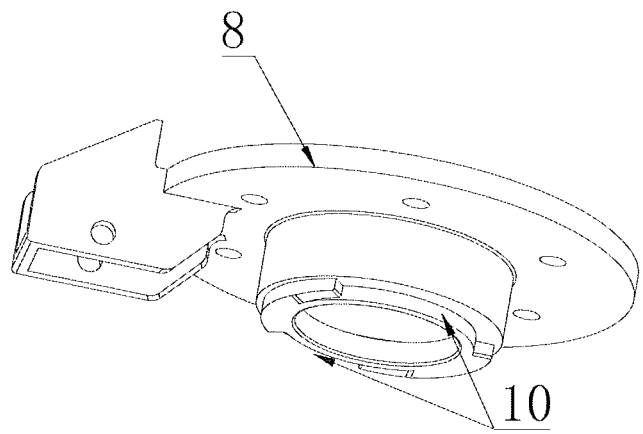
FIG. 5: a structural diagram of the fixed disk in another embodiment of the present disclosure.
Figure 6:
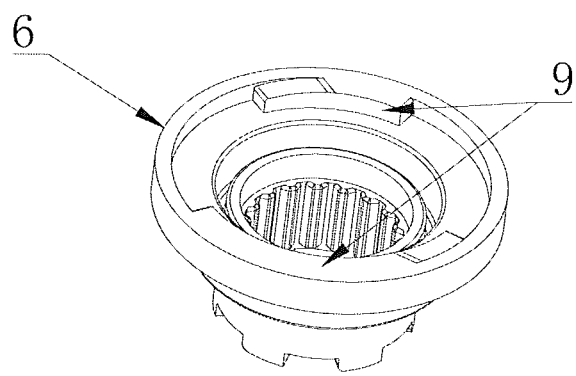
FIG. 6: a structural diagram of the clutch shaft sleeve in another embodiment of the present disclosure.
Figure 8:
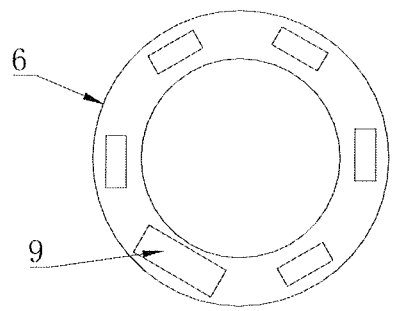
FIG. 8: a schematic plan view of the clutch shaft sleeve in another embodiment of the present disclosure.

As shown in FIG. 5, FIG. 6, FIG. 8, the connection part of the upper portion of the clutch shaft sleeve 6 fitting with the fixed disk 8 is provided with a plurality of protrusions 9, the shape and/or size of one of the protrusions 9 are different from the shape and/or size of the other protrusions. Recesses 10 corresponding to the protrusions 9 are provided on the fixed disk 8. Only if the protrusion which has the different shape and/or size from others is corresponding to the recess 10 on the fixed disk, will the clutch shaft sleeve 6 connect to the fixed disk 8. So that ensures the protrusion 9 of the clutch shaft sleeve 6 can insert to the recess 10 of the fixed disk 8 for fitting connection at only one position when the clutch shaft sleeve 6 rotates a circle. The clutch shaft sleeve and the fixed disk are not able to rotate with each other after the connection. An included angle between the protrusion 9 which has different shape and/or size from others on the upper portion of the clutch shaft sleeve 6 and the first water drainage hole of the inner tub is equal to an included angle between the recess which has different shape and/or size from others on the fixed disk 8 and the drainage control mechanism on the outer tub. So that ensures the inner tub and the drainage control mechanism on the outer tub are corresponding to each other when the protrusion 9 of the clutch shaft sleeve 6 inserts to the recess 10 on the fixed disk 8 and fitting connected to each other.

Figure 7:
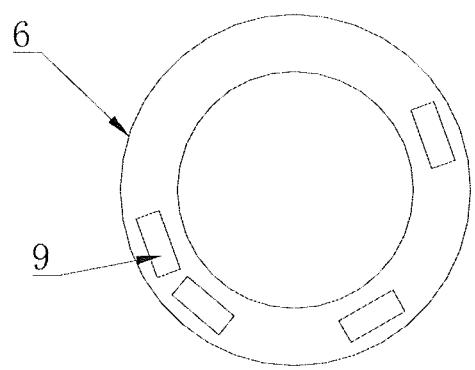
FIG. 7: a schematic top plan view of the clutch shaft sleeve in another embodiment of the present disclosure.

As shown in FIG. 7, the connection part of the upper portion of the clutch shaft sleeve 6 fitting with the fixed disk 8 is provided with a plurality of protrusions 9 which are nonuniformly distributed on the circumference and recesses 10 corresponding to the protrusions 9 are provided on the fixed disk 8. So that ensures the protrusion 9 of the clutch shaft sleeve 6 can insert to the recess 10 of the fixed disk 8 for fitting connection at only one position when the clutch shaft sleeve 6 rotates a circle. The clutch shaft sleeve and the fixed disk are not able to rotate with each other after the connection. The included angle between the protrusion 9 on the upper portion of the clutch shaft sleeve 6 and the first water drainage hole of the inner tub is equal to the included angle between the recess 10 on the fixed disk 8 and the drainage control mechanism on the outer tub. So that ensures the inner tub and the drainage control mechanism on the outer tub are corresponding to each other when the protrusion 9 of the clutch shaft sleeve 6 inserts to the recess 10 on the fixed disk 8 and fitting connected to each other.

An upper end surface of the clutch shaft sleeve 6 is fit connected with a lower end surface of the fixed disk 8. The upper end surface of the clutch shaft sleeve 6 is provided with the protrusion 9 and the lower end surface of the fixed disk 8 is provided with the recess 10. Alternatively, the upper end surface of the clutch shaft sleeve 6 is provided with the recess 10 and the lower end surface of the fixed disk 8 is provided with the protrusion 9. Processing the protrusion and the recess on the end surface is easy to process, with small margin and keeps zero angle with turn.

An outer circumference of the upper portion of the clutch shaft sleeve 6 is engaged with an inner circumference of a lower portion of the fixed disk 8. The outer circumference of the upper portion of the clutch shaft sleeve 6 is provided with the protrusion 9 and the inner circumference of the lower portion of the fixed disk 8 is provided with the recess 10. Alternatively, the outer circumference of the upper portion of the clutch shaft sleeve 6 is provided with the recess 10 and the inner circumference of the lower portion of the fixed disk 8 is provided with the protrusion 9. Or an inner circumference of the upper portion of the clutch shaft sleeve 6 is engaged with an outer circumference of the lower portion of the fixed disk 8. The inner circumference of the upper portion of the clutch shaft sleeve 6 is provided with the protrusion 9 and the outer circumference of the lower portion of the fixed disk 8 is provided with the recess 10. or the inner circumference of the upper portion of the clutch shaft sleeve 6 is provided with the recess 10 and the outer circumference of the lower portion of the fixed disk 8 is provided with the protrusion 9. A height of the protrusion provided on the end surface can be reduced, and the height in the axial direction can be effectively reduced, the space occupied by the reduction clutch in the axis direction can be reduced, and the washing space of the washing machine is increased.

A method of positioning the inner tub is provided. After the completion of the dewatering or before the water supply of the washing, the clutch shaft sleeve 6 is driven to move upward, and the input shaft sleeve 2 drives the clutch shaft sleeve 6 to move in the circumferential direction under the action of the driving motor or the action of inertia. When the protrusion 9 of the clutch shaft sleeve 6 is corresponding to the recess 10 of the fixed disk 8, the protrusion 9 inserts into the recess 10 to fitting connection which locks the input shaft sleeve 2, the output shaft sleeve 5 and the positioned inner tub at a same position, so that the water outlet of the inner tub and the control structure of the water outlet are corresponding to each other. And the protrusion 9 of the clutch shaft sleeve 6 can insert to the recess 10 of the fixed disk 8 for fitting connection at only one position when the clutch shaft sleeve 6 rotates a circle. Thus, it locks the inner tub at the same position each time so that the water outlet of the inner tub and the control structure of the water outlet are corresponding to each other.

When switching from the dewatering to the washing, firstly the inner tub is positioned and locked, and the drainage control mechanism closes the first drainage hole to ensure the positions are corresponding to each other and then to further act, so that accuracy is guaranteed. When switching from the washing to dewatering, firstly the drainage control mechanism acts to open the first drainage hole to avoid the damage to the drainage control mechanism caused by the rotation of the inner tub.

If the clutch shaft sleeve is disengaged from the driving device at the lower portion and has not connected to the fixed disk at the upper portion, the clutch shaft sleeve is driven by the inertia of the inner tub to move in the circumferential direction to adjust the relative position of the clutch shaft sleeve and the fixed disk at the circumferential direction. If the clutch shaft sleeve connects to the fixed disk right after it disengaged from the driving device at the lower portion, the clutch shaft sleeve is driven by the driving force of the driving device to move in the circumferential direction to adjust the relative position of the clutch shaft sleeve and the fixed disk at the circumferential direction.

The above description is only a preferred embodiment of the present disclosure. It should be noted that it will be apparent to one skilled in the art that various modifications and improvements can be made therein without departing from the principles of the present disclosure, which should also be considered as a protection of the present disclosure.

The invention claimed is:

1. A reduction clutch capable of positioning an inner tub, comprising
   an input shaft,
   an input shaft sleeve, a gear train,
   an output shaft for driving a pulsator,
   an output shaft sleeve for driving the inner tub, and
   a clutch shaft sleeve outside the output shaft sleeve which is slidably and irrotationally connected to the output shaft sleeve,
   the input shaft being connected to the output shaft via the gear train, the input shaft sleeve being connected to the output shaft sleeve, and
   the clutch shaft sleeve sliding axially to a lower portion to connect to a driving device and sliding to an upper portion to connect to a fixed disk,
   wherein, the clutch shaft sleeve sliding to the upper portion only has one connecting position capable of connecting to the fixed disk in a circumferential direction, and
   the input shaft sleeve, the output shaft sleeve and the inner tub in the circumferential direction are positioned by the connecting position.

2. The reduction clutch capable of positioning the inner tub according to claim 1, wherein, the clutch shaft sleeve is connected to the fixed disk by key-tooth connection, a connection part of the upper portion of the clutch shaft sleeve fitting with the fixed disk is provided with at least one protrusion, and a recess corresponding to the protrusion is provided on the fixed disk,
   wherein when the clutch shaft sleeve rotates a circle, the protrusion of the clutch shaft sleeve inserts to the recess of the fixed disk for fitting connection at only one position, and the input shaft sleeve, the output shaft sleeve and the inner tub in the circumferential are positioned by the connecting position.

3. The reduction clutch capable of positioning the inner tub according to claim 2, wherein, the connection part of the upper portion of the clutch shaft sleeve fitting with the fixed disk is provided with only one protrusion, and only one recess corresponding to the protrusion is provided on the fixed disk,
   a shape and size of the protrusion are the same as a shape and size of the recess, and
   the protrusion and the recess are not able to rotate relatively to each other in the circumferential direction when the protrusion and the recess fit in, so that the inner tub is positioned.

4. The reduction clutch capable of positioning the inner tub according to claim 2, wherein, the connection part of the upper portion of the clutch shaft sleeve fitting with the fixed disk is provided with a plurality of protrusions, the shape and/or size of one of the protrusions are different from the shape and/or size of the other protrusions, recesses corresponding to the protrusions are provided on the fixed disk.

5. The reduction clutch capable of positioning the inner tub according to claim 2, wherein, the connection part of the upper portion of the clutch shaft sleeve fitting with the fixed disk is provided with a plurality of protrusions which are nonuniformly distributed on the circumference, and the recesses corresponding to the protrusions are provided on the fixed disk.

6. The reduction clutch capable of positioning the inner tub according to claim 2, wherein, an upper end surface of the clutch shaft sleeve is connected with a lower end surface of the fixed disk,
   the upper end surface of the clutch shaft sleeve is provided with the protrusion and the lower end surface of the fixed disk is provided with the recess,
   or the upper end surface of the clutch shaft sleeve is provided with the recess and the lower end surface of the fixed disk is provided with the protrusion.

7. The reduction clutch capable of positioning the inner tub according to claim 2, wherein, an inner circumference of the upper portion of the clutch shaft sleeve is engaged with an outer circumference of the lower portion of the fixed disk,
   the inner circumference of the upper portion of the clutch shaft sleeve is provided with the protrusion and the outer circumference of the lower portion of the fixed disk is provided with the recess,
   or the inner circumference of the upper portion of the clutch shaft sleeve is provided with the recess and the outer circumference of the lower portion of the fixed disk is provided with the protrusion.

8. The washing machine having the reduction clutch capable of positioning the inner tub according to claim 2, wherein, a first drainage hole is provided at a bottom of the inner tub, and a second drainage holes are arranged in a circle on an upper portion of the inner tub,
   the inner tub acts as a water containing tub during a washing process and there is no water between the inner and outer tubs,
   a drainage control mechanism for controlling an opening/closing of the first drainage hole is provided at a bottom of the outer tub,
   an included angle between the protrusion on the upper portion of the clutch shaft sleeve and the first water drainage hole of the inner tub is equal to an included angle between the recess on the fixed disk fitting with the protrusion and the drainage control mechanism on the outer tub.

9. The reduction clutch capable of positioning the inner tub according to claim 1, wherein, the connection part of the upper portion of the clutch shaft sleeve fitting with the fixed disk is provided with only one protrusion, and only one recess corresponding to the protrusion is provided on the fixed disk,
   a shape and size of the protrusion are the same as a shape and size of the recess, and the protrusion and the recess are not able to rotate relatively to each other in the circumferential direction when the protrusion and the recess fit in, so that the inner tub is positioned.

10. The washing machine having the reduction clutch capable of positioning the inner tub according to claim 9, wherein, a first drainage hole is provided at a bottom of the inner tub, and a second drainage holes are arranged in a circle on an upper portion of the inner tub, the inner tub acts as a water containing tub during a washing process and there is no water between the inner and outer tubs, a drainage control mechanism for controlling an opening/closing of the first drainage hole is provided at a bottom of the outer tub, an included angle between the protrusion on the upper portion of the clutch shaft sleeve and the first water drainage hole of the inner tub is equal to an included angle between the recess on the fixed disk fitting with the protrusion and the drainage control mechanism on the outer tub.

11. The reduction clutch capable of positioning the inner tub according to claim 1, wherein, the connection part of the upper portion of the clutch shaft sleeve fitting with the fixed disk is provided with a plurality of protrusions, the shape and/or size of one of the protrusions are different from the shape and/or size of the other protrusions, recesses corresponding to the protrusions are provided on the fixed disk.

12. The washing machine having the reduction clutch capable of positioning the inner tub according to claim 11, wherein, a first drainage hole is provided at a bottom of the inner tub, and a second drainage holes are arranged in a circle on an upper portion of the inner tub, the inner tub acts as a water containing tub during a washing process and there is no water between the inner and outer tubs, a drainage control mechanism for controlling an opening/closing of the first drainage hole is provided at a bottom of the outer tub, an included angle between the protrusion on the upper portion of the clutch shaft sleeve and the first water drainage hole of the inner tub is equal to an included angle between the recess on the fixed disk fitting with the protrusion and the drainage control mechanism on the outer tub.

13. The reduction clutch capable of positioning the inner tub according to claim 1, wherein, the connection part of the upper portion of the clutch shaft sleeve fitting with the fixed disk is provided with a plurality of protrusions which are nonuniformly distributed on the circumference, and the recesses corresponding to the protrusions are provided on the fixed disk.

14. The washing machine having the reduction clutch capable of positioning the inner tub according to claim 13, wherein, a first drainage hole is provided at a bottom of the inner tub, and a second drainage holes are arranged in a circle on an upper portion of the inner tub, the inner tub acts as a water containing tub during a washing process and there is no water between the inner and outer tubs, a drainage control mechanism for controlling an opening/closing of the first drainage hole is provided at a bottom of the outer tub, an included angle between the protrusion on the upper portion of the clutch shaft sleeve and the first water drainage hole of the inner tub is equal to an included angle between the recess on the fixed disk fitting with the protrusion and the drainage control mechanism on the outer tub.

15. The reduction clutch capable of positioning the inner tub according to claim 1, wherein, an upper end surface of the clutch shaft sleeve is connected with a lower end surface of the fixed disk, the upper end surface of the clutch shaft sleeve is provided with the protrusion and the lower end surface of the fixed disk is provided with the recess, or the upper end surface of the clutch shaft sleeve is provided with the recess and the lower end surface of the fixed disk is provided with the protrusion.

16. The washing machine having the reduction clutch capable of positioning the inner tub according to claim 15, wherein, a first drainage hole is provided at a bottom of the inner tub, and a second drainage holes are arranged in a circle on an upper portion of the inner tub, the inner tub acts as a water containing tub during a washing process and there is no water between the inner and outer tubs, a drainage control mechanism for controlling an opening/closing of the first drainage hole is provided at a bottom of the outer tub, an included angle between the protrusion on the upper portion of the clutch shaft sleeve and the first water drainage hole of the inner tub is equal to an included angle between the recess on the fixed disk fitting with the protrusion and the drainage control mechanism on the outer tub.

17. The reduction clutch capable of positioning the inner tub according to claim 1, wherein, an outer circumference of the upper portion of the clutch shaft sleeve is engaged with an inner circumference of a lower portion of the fixed disk, the outer circumference of the upper portion of the clutch shaft sleeve is provided with the protrusion and the inner circumference of the lower portion of the fixed disk is provided with the recess, or the outer circumference of the upper portion of the clutch shaft sleeve is provided with the recess and the inner circumference of the lower portion of the fixed disk is provided with the protrusion.

18. The reduction clutch capable of positioning the inner tub according to claim 1, wherein, an inner circumference of the upper portion of the clutch shaft sleeve is engaged with an outer circumference of the lower portion of the fixed disk, the inner circumference of the upper portion of the clutch shaft sleeve is provided with the protrusion and the outer circumference of the lower portion of the fixed disk is provided with the recess, or the inner circumference of the upper portion of the clutch shaft sleeve is provided with the recess and the outer circumference of the lower portion of the fixed disk is provided with the protrusion.

19. A washing machine having the reduction clutch capable of positioning the inner tub according to claim 1, wherein, a first drainage hole is provided at a bottom of the inner tub, and a second drainage holes are arranged in a circle on an upper portion of the inner tub, the inner tub acts as a water containing tub during a washing process and there is no water between the inner and outer tubs, a drainage control mechanism for controlling an opening/closing of the first drainage hole is provided at a bottom of the outer tub, an included angle between the protrusion on the upper portion of the clutch shaft sleeve and the first water drainage hole of the inner tub is equal to an included angle between the recess on the fixed disk fitting with the protrusion and the drainage control mechanism on the outer tub.

20. The reduction clutch capable of positioning the inner tub according to claim 1, wherein, an outer circumference of the upper portion of the clutch shaft sleeve is engaged with an inner circumference of a lower portion of the fixed disk, the outer circumference of the upper portion of the clutch shaft sleeve is provided with the protrusion and the inner circumference of the lower portion of the fixed disk is provided with the recess, or the outer circumference of the upper portion of the clutch shaft sleeve is provided with the recess and the inner circumference of the lower portion of the fixed disk is provided with the protrusion.

\* \* \* \* \*